United States Patent [19]

Buhr, deceased

[11] 3,973,301
[45] Aug. 10, 1976

[54] SPRING HOOK

[75] Inventor: Hermann Buhr, deceased, late of Velbert, Germany, by Marlles Buhr, heir

[73] Assignee: Firma Gebr. Batz, Heiligenhaus, Rhineland, Germany

[22] Filed: Mar. 5, 1975

[21] Appl. No.: 555,690

[52] U.S. Cl. .............................................. 24/239
[51] Int. Cl.² ...................................... A44B 13/02
[58] Field of Search ....................... 24/241 SL, 239

[56] References Cited
UNITED STATES PATENTS

| 100,364 | 3/1870 | Brady et al. | 24/239 |
|---|---|---|---|
| 563,071 | 6/1896 | Schleicher | 24/239 |
| 759,806 | 5/1904 | Broga | 24/241 SL |
| 1,134,311 | 4/1915 | Baxter | 24/239 |
| 1,527,809 | 2/1925 | MacDonald | 24/239 |
| 1,596,853 | 8/1926 | Nittel | 24/239 |
| 1,599,112 | 9/1926 | Boots | 24/239 |
| 2,133,901 | 10/1938 | Mestekin | 24/241 SL |
| 3,815,184 | 6/1974 | Hopp | 24/241 SL |

FOREIGN PATENTS OR APPLICATIONS

| 7,055 | 7/1898 | Norway | 24/241 SL |

*Primary Examiner*—Bernard A. Gelak
*Attorney, Agent, or Firm*—Martin A. Farber

[57] ABSTRACT

A spring hook having a hook mouth closeable by a slide guided on the hook shank, which slide is spring loaded in the direction of the closed position of the hook mouth. A plug in - snap assembly is provided between the slide and the hook shank.

8 Claims, 12 Drawing Figures

SPRING HOOK

The present invention relates to a carbine or spring hook, in general, and to a spring hook with a hook mouth locked by a slide guided on the hook shank, which slide is spring biased in the direction of the closing position of the hook mouth, in particular.

With known embodiment forms according to this type of spring hooks, several kinds of displaceable to each other coordinated arrangements of the slide and hook shank are known. One of these known embodiment forms, U.S. Pat. No. 240,333, has a slide which possess laterally projecting tabs, which are subsequently deformed and grip about the hook shank in the assembled condition, whereby they form an annular guide. It is likewise known to construct the slide in two parts, Switzerland Pat. No. 242,909, whereby a carrying section is provided with lateral tabs, which tabs are fixed with the hook shank, for example by rivet connections, and whereby a displaceable closing part is guided in the space between the hook shank and this section of the slide. One other known spring hook, U.S. Pat. No. 1,443,311, has a guide part emerging from the hook shank, in which the slide is pushed in here from the back side, whereby the back sided opening is closed by means of a threaded plate or disc after setting in of the compression spring, which plate simultaneously serves as an abutment for the spring.

It is one task and object of the invention, particularly, that is, additionally to the tasks and objects resulting from the specification and claims, to construct a spring hook according to the introductory named type in a simpler commercial production manner, such that a tool-less assembly is possible without subsequent working of the construction parts.

This task is solved in accordance with another object of the invention, by a spring hook having a hook mouth closeable by a slide, and a form part longitudinally moveable mounted on the shank having laterally extending wings and biased by a spring in the direction of the closed position of the hook mouth, characterized by a plug in — catch or snap assembly between the slide and the hook shank by hook-like projections of the slide engaging the wings.

Further objects of the invention are to provide advantageous spring hook constructions in accordance with the above objects and as set forth in the dependent claims.

As a result of such construction, a spring hook according to the introductory named type is created of increased service value. The assembling of the construction parts no longer is required to be provided by machine. Before the assembling, the construction parts can already be completely worked, that is the material surface can be improved or finished, since no material deformation occurs during the assembling and damages to the finished surface are excluded. Hereby, the possibility resides of producing the slide and hook shank by injection molding or die casting of zinc. The displaceable fastening of the slide on the hook shank results merely by radial insertion with a manual movement. In spite of this assembling, a stable, irreversible connection is achieved between the slide and hook shank. The stable fastening succeeds without additional expenditure on construction parts, since the compression spring, which is necessary for the loading of the slide in the closing direction of the mouth of the hook, is most favorably suited for the radial securing thereof. The compression spring is provided in a bracket, i.e., plate, shaped section of the hook shank, which section has a recess for the retention, which recess breaks through the material like a window. The diameter of the spring, in connection with this is kept significantly larger than the relatively thin walled bracket shaped section of the hook shaft. Thus sufficient sections of the spring remain free for the snap catch or notch connection with the slide. The favorable retention of the spring in the recess of the bracket shaped sction brings about, likewise, advantages for the assembling. The spring can be introduced in the recess and remains there securely by means of its spring tension until the slide is plugged on. After the slide is fixed on the hook shank by means of the plug in — snap catch connection, the spring, by means of the slide, and the peripheral edges of the recess of the bracket shaped section, is so stably retained, that radial spring movements are avoided; the inserted slide is maintained tilt free. In order to be able to use also small cross-sectional springs and nevertheless to achieve an optimal stable holding, it is advantageous to coordinate a spring form part to the upper end of the spring, which form part can be made of a stable inelastic material. Thereby the radial stability of the slide is increased so with strong tension loads in radial direction, that there is provided a secure irreversible connection of the two construction parts of the spring hook, which parts are displaceable relative to each other. The slide process, in this connection, for a most extensive play free retention of the spring - form part, correspondingly formed lock projections, which, for example, with a polygonal spring form part, grip behind the wing sections projecting laterally beyond the cross-section of the bracket shaped section.

The assembling also here is kept most extremely simple and is carried out by means of a manual movement requiring the expenditure of a small force. The compression spring with the upper spring - form part, before the catching on of the slide, is provided in the recess of the bracket shaped section; the spring - form part, then by successive radial pressing and axial downward displacement of the slide, enters in a plug in — catch connection with the lock projections. The lock projections are here most favorably arranged, spaced from the lower end of the slide, such that with the set on slide, a relatively strong spring force occurs in the closing direction of the mouth of the hook. After the assembling has occurred the spring is completely embraced and covered by the U-legs of the slide and the recess of the shank, so that the spring is provided crook free and protected in concealed position. The front ends of the slide-U-legs extend here up to the transition steps between the bracket shaped section and the hook shank, so that also the guiding of the slide on the hook shaft planarly takes place play free and tilt free.

With the above and other objects and advantages in view, the present invention will become more fully understood in connection with the detailed description of an embodiment example with reference to the accompanying drawings, of which:

Figure 1:
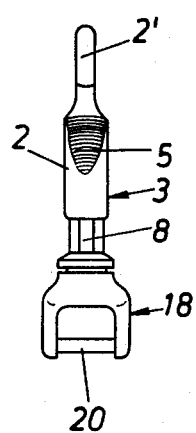
FIG. 1 is a front view of a spring hook in accordance with the present invention.
Figure 2:
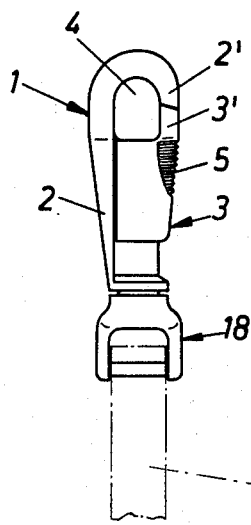
FIG. 2 is a side view of the spring hook of FIG. 1.
Figure 3:
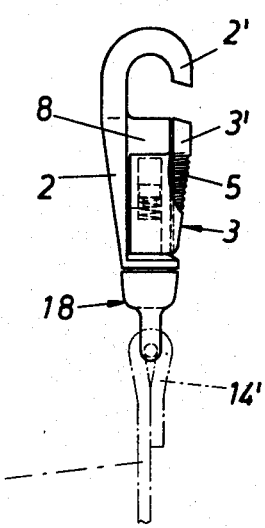
FIG. 3 is a side view of the spring hook with opened hook mouth.
Figure 4:
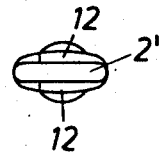
FIG. 4 is a top plan view of FIG. 2.

Referring now to the drawings, the spring hook 1 in accordance with the invention comprises a hook shank 2, and a slide 3 displaceably coordinated to the latter.

The hook shank 2 forms a hook mouth 4 at the upper side by means of a hook 2' which is closed by the slide 3. The slide 3 has a ridged working surface 5 for the displacement.

The slide 3 is spring loaded in a closing direction by means of a compression spring 6.

The compression spring 6 is disposed in a recess 7 of a bracket or plate shaped section 8 of the hook shank 2. On the upper side, the compression spring 6 carries a pinned on, for example square spring - form part 9 which projects with a lower sided pin in the uppermost winding of the spring. The spring - form part 9 is formed with portions which laterally extend at both sides of the bracket 8 of the shank 2 (the bracket 8 constituting a part of the shank 2). The form part 9 as well as the compression spring 6 are considerably larger in cross-section than the cross-section of the plate shaped section 8. In the drawing, the spring - form part 9 serves for the plug in — snap or catch connection with the slide 3.

The slide is constructed U-shaped in its section directed to the hook shank, serving for the snap connection, whereby the open inner dimension between the two U-legs 12 in the lower leg range S1 is slightly larger than the width of the spring - form part 9; the upper leg sections S2 of the U-legs, to the contrary, have an open inner dimension which merely corresponds to the cross-section of the plate shaped section of the hook shank 2.

The section S2 of the two U-legs possess downwardly directed lock projections, whereby the front lock projection 10 stands at the distance A relative to the lower side of the slide, the lock projection 11 U positioned close to the U-web, to the contrary extends up to the lower edge of the slide.

The two lock projections 10 and 11 form consequently a catch section R, which corresponds to the cross-sectional shape of the spring - form part 9.

The assembling of the hook shank and slide is as follows: The compression spring 6 is inserted jointly with the spring - form part 9, under slight spring tension, in the recess 7 of the plate formed section 8. The slide is now set radially to the hook shank, and indeed such that the lower edges of the lock projections 10 lie centrally over the upper side of the spring - form part 9. The upper sided stud shaped mouth section 3' of the slide 3 steps in this case against the hook 2' of the shank 2. The slide 3 is moved now in axial direction (in the arrow direction X) vertically downwardly, whereby the lock projections 10 press the compression spring 6 by means of the spring - form part 9, until the mouth section 3' comes to lie under the lower edge of the hook 2'. Now the slide 3 is pressed in the radial direction towards the shank 2 such that the U-legs take the plate formed section 8 therebetween and the spring - form part 9 steps behind the hook-like lock projections 10 (i.e., with the projections 10 hook-like engaging over or behind the laterally extending wings of the form part 9) and due to the spring force snugly complementarily arrives in the catch space R. The slide 3 is disposed thus irreversibly on the hook shank 2.

Figure 5:
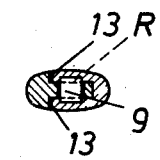
FIG. 5 is a horizontal cross-sectional view through the spring hook.
Figure 6:
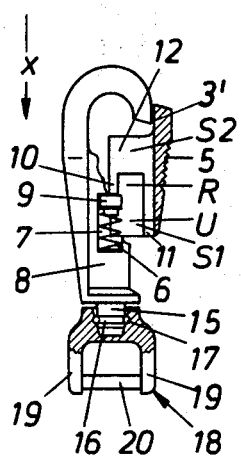
FIG. 6 is a side view of the spring hook with the spring shank and slide in a still not assembled condition, partly broken away and in section.
Figure 7:
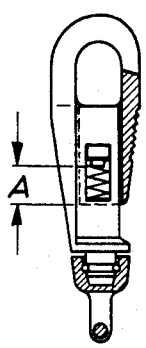
FIG. 7 is a side view of the spring hook showing both parts in assembled condition and partly broken open and in section.
Figures 8, 9:
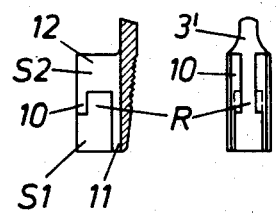
FIG. 8 is a view of the slide in a longitudinally sectioned independent illustration.
FIG. 9 is a front view to the slide of FIG. 8.
Figure 10:
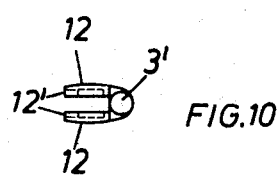
FIG. 10 is a top plan view of the slide.
Figures 11, 12:
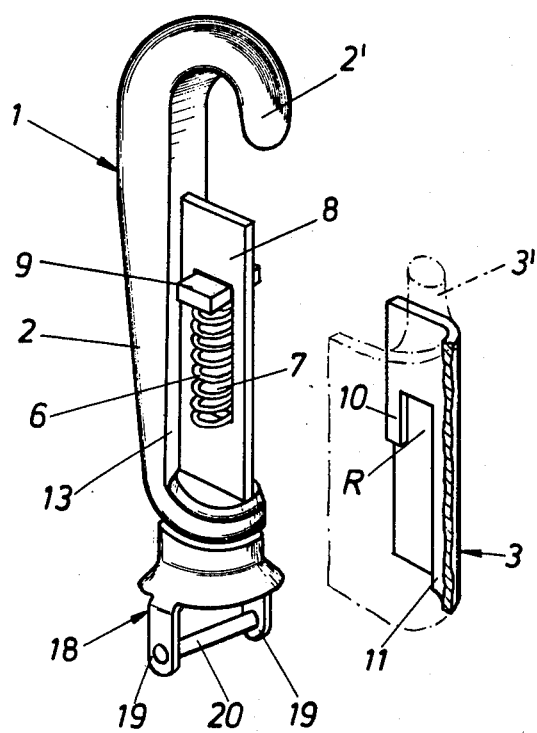
FIG. 11 is a perspective view of the hook shank portions.
FIG. 12 is a perspective view of the slide, partly broken away.

In the assembled position, the hook shank 2 and the slide 3 cooperatively have an elliptically shaped cross-sectional form (note FIG. 5), whereby the front ends 12' of the U-legs extend up to the transition or connection steps 13 of the cross-sectionally larger shank 2 to the plate shaped section 8.

For connecting the spring hook 1, for example with a strap 14, the hook shank 2 possess a pin 15 at the lower side, which pin is provided with an annular groove 16, which groove 16 serves for the reception of a spring ring 17. A loop 18 is pinned on this pin 15, which loop 18 for this purpose has a recess corresponding to the shape of the pin, the recess likewise being provided with an annular groove such that the loop 18 can be clipped or snapped on the pin 15, in this case remaining freely rotatable.

The loop is provided with two loop legs 19, which have bore holes lying flush opposite to each other close to the free ends of the loop legs 19. A peg bar 20 is pinned in the bore holes in a forced fit, which bar 20, for example, is embraced by a runner loop 14' of the strap 14. The split loop 18, in this connection has the advantage, that already, straps provided with loops 14' can be coordinated subsequently to the spring hook. By the straight bar 20, moreover, it is avoided that the loop section engaging on the peg gathers up or contracts during loading, thereby being subjected to strong stresses or wear.

While I have disclosed one embodiment of my invention, it is to be understood that this embodiment is given by example only and not in a limiting sense.

It is claimed:

1. A spring hook, comprising
    a hook shank defining a longitudinal direction and having a hook mouth,
    a form part mounted on said shank longitudinally moveable relative thereto and having wings laterally extending at both sides of said shank, respectively,
    slide means for closing said hook mouth, said slide means including hook-like projections adjacent both sides, respectively, of said shank, said projections extending toward said form part and hook-like engaging behind said wings, respectively, of the form part for locking said slide means into operative joint moveable position therewith, said slide means longitudinally moveable with said form part relative to said shank,
    biasing means constituting a separate spring for biasing said form part, and thereby said slide means, in a direction toward closing said hook mouth by said slide means.
    said slide means including said projections in cooperation with said form part including said wings constituting a plug-in catch connection of said slide means with respect to said hook shank.

2. The spring hook, as set forth in claim 1, wherein said hook shank includes a plate-shaped section arranged in the longitudinal direction of the shank and formed with a recess,
said spring and said form part are disposed in said recess.

3. The spring hook, as set forth in claim 2, wherein said spring has a diameter larger than the thickness of said plate-shaped section.

4. The spring hook, as set forth in claim 2, wherein said recess extends in the longitudinal direction of said shank, said form part is moveably disposed along the longitudinal direction of said recess, said form part is transversely oriented relative to said plate-shaped section with said wings projecting laterally beyond said section.

5. The spring hook, as set forth in claim 2, wherein said form part has a pin formed on a lower side thereof,
said spring has an uppermost winding in which said pin projects.

6. The spring hook, as set forth in claim 2, wherein said slide means has a lower end, said projections include hook-like ends disposed in spaced relationship from said lower end of said slide means.

7. The spring hook, as set forth in claim 2, wherein said slide means is of U-shape having U-legs outwardly encompassing said projections, and completely covering said recess.

8. The spring hook, as set forth in claim 2, wherein said hook shank is formed with transition steps, respectively, on both sides thereof, integrally leading to said plate-shaped section,
said slide means is of U-shape having U-legs, the latter having front ends thereof engaging said transition steps, respectively.

* * * * *

UNITED STATES PATENT AND TRADEMARK OFFICE
CERTIFICATE OF CORRECTION

PATENT NO. : 3,973,301

DATED : AUGUST 10, 1976

INVENTOR(S) : HERMANN BUHR

It is certified that error appears in the above-identified patent and that said Letters Patent are hereby corrected as shown below:

On the first page insert:

-- FOREIGN APPLICATION PRIORITY DATA

March 9, 1974      Germany..................2411335.7 --

Signed and Sealed this

Twenty-first Day of December 1976

[SEAL]

Attest:

RUTH C. MASON
Attesting Officer

C. MARSHALL DANN
Commissioner of Patents and Trademarks